United States Patent

Fohn et al.

[11] Patent Number: 6,014,639
[45] Date of Patent: Jan. 11, 2000

[54] ELECTRONIC CATALOG SYSTEM FOR EXPLORING A MULTITUDE OF HIERARCHIES, USING ATTRIBUTE RELEVANCE AND FORWARDING-CHECKING

[75] Inventors: Steffen Michael Fohn, Poughkeepsie, N.Y.; Arthur Reginald Greef, Seattle, Wash.

[73] Assignee: International Business Machines Corporation, Armonk, N.Y.

[21] Appl. No.: 08/964,564

[22] Filed: Nov. 5, 1997

[51] Int. Cl.[7] .................................................. G06F 17/30
[52] U.S. Cl. ........................... 705/27; 705/1; 705/26; 707/10; 707/103; 707/3
[58] Field of Search ............................... 705/5, 26, 1, 27; 707/1, 4, 5, 103, 104, 10; 704/4

[56] References Cited

U.S. PATENT DOCUMENTS

| | | | |
|---|---|---|---|
| 4,318,184 | 3/1982 | Millett | 707/1 |
| 5,241,671 | 8/1993 | Read | 707/4 |
| 5,598,557 | 1/1997 | Doner | 705/5 |
| 5,630,125 | 5/1997 | Zellweger | 707/103 |
| 5,715,444 | 2/1998 | Danish | 707/4 |
| 5,740,425 | 4/1998 | Povilus | 707/100 |
| 5,754,938 | 5/1998 | Hertz et al. | 455/4.2 |
| 5,870,717 | 2/1999 | Wiecha | 705/26 |

FOREIGN PATENT DOCUMENTS

WO 96/12238  4/1996  WIPO .............................. G06F 17/30

OTHER PUBLICATIONS

Mittal, Falkenhainer ( 1990) "DynamicConstraint Satisfaction Problems" pp. 25–32 , AAAI–1990.

Levy, Alon, Y., "Irrelevance Reasoning in Knowledge Based Systems", Ph.D. Dissertation Stanford University Calif.

Sowa, J. (1984) "Conceptual Structures: Information Processing In Mind and (pp. 67–73)Machine", AddisonWesley-Publisher.

*Primary Examiner*—Allen R. MacDonald
*Assistant Examiner*—Romain Jeanty
*Attorney, Agent, or Firm*—Steven J. Meyers

[57] ABSTRACT

This electronic catalog searching system first, calculates attribute relevance (e.g., strongly-relevant, weakly-relevant, and irrelevant) for each node in a hierarchy (e.g., abstraction hierarchy, decompositional hierarchy) based on assignment constraints made at the nodes representing real-world concrete entities and then combines attribute relevance with a forward-checking parametric search to implement a hierarchical exploration scheme that can be enabled over a multitude of hierarchies residing on a base of concrete entities.

25 Claims, 6 Drawing Sheets

ELECTRONIC CATALOG SYSTEM FOR EXPLORING A MULTITUDE OF HIERARCHIES, USING ATTRIBUTE RELEVANCE AND FORWARDING-CHECKING

BACKGROUND INFORMATION

1. Field of Invention

This invention describes an electronic catalog searching system and more particularly, a catalog searching system for object oriented databases.

2. Background Art

It is well recognized that procurement systems have traditionally been manual, labor intensive and quite costly operations. Suppliers, for example will do mass mailings of catalogs to potential customers, the customers would browse the catalogs and select items to be purchased and then the customer would complete a paper order form, or call the supplier to order the items. The entire process, from preparing the catalog to receipt of the order, is very labor intensive and often took several weeks. If a supplier wanted to continually update his catalogs, or provide different price schedules to different customers, the printing, distribution and administrative costs would be substantial.

On a relatively small scale, some suppliers have offered catalogs through computer services, such as PRODIGY (TM). Employing PRODIGY (TM), a computer user can dial-up a service from home and select items to purchase from various catalogs maintained on the system. Upon selection, PRODIGY (TM) initiates the order with the supplier. While this has made significant improvements in typical procurement situations, there are still numerous needs remaining to be fulfilled.

The recent proliferation of electronic media has resulted in an explosion of electronic catalogs, for the managing parts within businesses and corporations and for selling products to consumers. Accompanying this growth is the continued investigation and implementation of different browsing strategies that offer intuitive techniques to aid users when searching and navigating large spaces of information. Electronic catalogs typically provide some form of search or navigation capability that users can employ in the location of parts or products.

Regarding this navigation capability, let us consider "Hierarchical Navigation" techniques as demonstrated by this instant invention. The majority of electronic catalogs have some category structure (e.g., node hierarchy) under which parts or products are categorized such as Cadis, Net. Commerce, Saqquara, Trilogy, Mediashare, iCat. This category hierarchy provides an alternative to search in the location of parts or products in an electronic catalog.

Parametric search techniques are based on the specification of values for attributes (or parameters). The simplest and most common form of search available in electronic catalogs today is keyword search (e.g. find the parts that have substring TP001 in their product descriptions). The next most common form of search is parametric search (e.g., find the product with an attribute "memory" whose value is "32 mb"). A more complex form of parametric search is enable when it is combined with "forward checking". Forward Checking involves a consistency maintenance mechanism that consists of a pruning technique that when implemented with a parametric search dynamically restricts attribute domains based on past attribute value assignments.

Forward checking permits a limited form of attribute relevance. It is limited because an attribute must be either relevant or irrelevant; there is no notion of strong or weak relevance. An attribute is defined as strongly relevant when it is relevant to all entities of the current node in the hierarchy while an attribute is considered weakly relevant when the attribute is relevant to a subset of the entities of the current node in the hierarchy and is considered irrelevant when the attribute is not relevant to any of the entities of the current node in a hierarchy. An entity represents concrete things in the world (e.g. products, services, people, etc.). Throughout this patent application, the word entity and concrete entity are used interchangeably. It is further important to note that the term hierarchical exploration involves the utilization of attribute relevance combined with forward checking parametric search to browse and navigate node hierarchies.

Consider the sample products listed in Table 1. Notice that the first column, "Part Number", identifies the product, the second column represents the "Memory" attribute for the products, and the third column, "Battery Life" attribute for the products. Table 1, shows sample data.

TABLE 1

| Part Number | Memory | Hard Disk | Battery Life |
|---|---|---|---|
| TP001-M01 | 32 mb | 1.2 gb | 1.7 hr |
| TP001-M02 | 16 mb | 1.2 gb | 2.0 hr |
| TP001-M03 | 16 mb | 2.0 gb | 2.2 hr |
| AP001-N01 | 64 mb | 2.0 gb | — hr |

The parametric search interface may be visualized as shown in Table 2 where the attributes are shown on the left and the values listed off to the right. Initially, all attributes are relevant to the beginning of the search problem. The user goes about finding a product by making value selections for the attributes. Table 2 shows Sample User Interface-1.

TABLE 2

| Memory | 16 mb, 32 mb, 64 mb |
|---|---|
| Hard Disk | 1.2 gb, 2.0 gb |
| Battery Life | 1.7 hr, 2.0 hr, 2.2 hr. |

Given that a user has selected 2.0 gb as the value for Hard Disk attributes, the user interface would update as indicated in Table 3. Notice that "forward-checking" was used to narrow the domain of possible values for the Memory and Battery Life attributes to those values that remain consistent with the current set of attribute assignments. Maintaining consistency, here, refers to the act of only displaying the attribute values of those products that have not been eliminated as a result of past attribute value selections (the feasibility set of products). As a result of the 2.0 gb selection for Hard Disk both the TP001-M01 and TP002-M02 products have been eliminated from the feasibility set of products.

TABLE 3

| Memory | 16 mb, 64 mb |
|---|---|
| Hard Disk | 2.0 gb |
| Battery Life | 2.2 hr. |

Assume that a user selects 64 mb as the value for Memory, the user interface would be updated as indicated in Table 4. Notice that forward-checking was used to further narrow the domain of possible values for the Memory and Battery attributes. In addition notice that Battery Life was eliminated as an attribute from the interface; this is because its domain was narrowed to the empty set and consequently became irrelevant to the current state of the problem. As a result of the 64 mb selection for Memory, the TP003-M03 product has been eliminated from the feasible set of products; one product remains in the feasiblity set: AP001-N01

TABLE 4

| Memory | 64 mb |
|---|---|
| Hard Disk | 2.0 gb |

Notice that this sample demonstrates how parametric search when combined with forward checking provides a limited form of attribute relevance (i.e., attributes are either relevant or irrelevant). Existing catalogs that utilize this form of search (i.e., Saqquara, Net. Commerce Catalog Assistant, Trilogy, Cadis, and Calico) are limited to performing this type of search either over an entire product or part base or over a subset of products or parts within a categorization. There are several inadequacies of systems employing the hierarchical navigation and parametric search capabilities discussed above. These inadequacies are as follows:

1. Hierarchical navigation does not incorporate any form of parametric search or attribute relevance.
2. Parametric search is isolated either to the entire base of parts or products or to the products within the scope of a hierarchical node (i.e., category).
3. Parametric search does not allow for hierarchical navigation.
4. Parametric search does not allow for hierarchical browsing.
5. Several hierarchies may exist for a single base of parts or products.

SUMMARY OF THE INVENTION

The system of the instant invention addresses the above inadequacies of hierarchical navigation and parametric searching by combining attribute relevance and forward-checking parametric searches to implement a hierarchical exploration scheme. This electronic catalog searching system first, calculates attribute relevance (e.g., strongly-relevant, weakly-relevant, and irrelevant) for each node in a hierarchy (e.g., abstraction hierarchy, decomposition hierarchy) based on assignment constraints made at the nodes representing real-world concrete entities and then combines attribute relevance with a forward-checking parametric search to implement a hierarchical exploration scheme that can be enabled over a multitude of hierarchies residing on a base of concrete entities.

SUMMARY OF INVENTION

There are several inadequacies of systems employing the hierarchical navigation and parametric search capabilities, these are listed as follows:

1. Hierarchical navigation does not incorporate any form of parametric search or attribute relevance.
2. Parametric search is isolated either to the entire base of parts or products or to the products within the scope of a hierarchical node (i.e. category).
3. Parametric search does not allow for hierarchical navigation.
4. Parametric search does not allow for hierarchical browsing.
5. Several hierarchies may exist for a single base of parts or products.

The system of the instant invention consists of a method that addresses these inadequacies of hierarchical navigation and parametric search, by combining attribute relevance with forward-checking parametric search to implement a hierarchical exploration scheme. This scheme can be enabled over a multitude of hierarchies residing over a single entity base. An entity represents concrete things in the world (i.e., products, services, people, etc.).

DESCRIPTION OF THE INVENTION

Overview

The instant invention is a solution to the problems enumerated in the summary. This invention is based on the prior creation of two necessary pieces of information, both of which are commonly available in any electronic catalog system (i.e. Saqquara, Net. Commerce Catalog Assistant, Trilogy, Cadis, and Calico).

Figure 1:
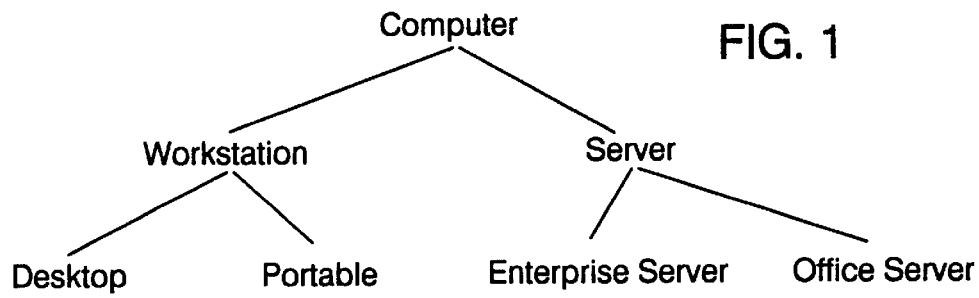
FIG. 1 Demonstrates the Category Node Hierarchy.

The first involves a hierarchy of nodes that serves to categorize in some form concrete entities; in most electronic catalogs the hierarchy is realized in the form book chapters, store departments, and classifications. FIG. 1 is an example of a node hierarchy consisting of a product categorization structure.

Figure 2:
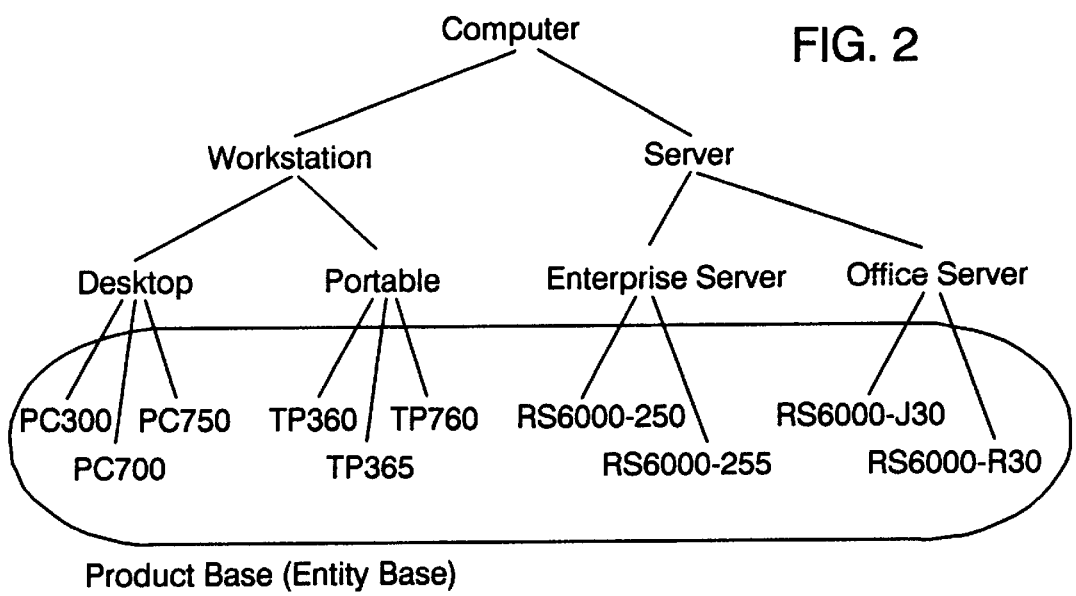
FIG. 2 Represents the Category (Node) Headachy to (Entity) Relationship.

The second represents a base of entities where each entity has local attribute declarations and assignments; in most electronic catalogs this base of entities comprises a base of products or parts. FIG. 2 is an example of an entity base comprised of a set of products categorized according to the node hierarchy of FIG. 1. A primary advantage associated with this invention is its ability to utilize existing entity data from which to enable a hierarchical exploration scheme. In other words, it is not necessary to rework the database. Given the existence and accessibility of this information, the following section provides a description of how the instant invention facilitates and implements hierarchical exploration.

DETAILED DESCRIPTION OF THE EMBODIMENT OF THIS INVENTION

Before hierarchical exploration can be enable, it is necessary that the exploration engine either have access to attribute relevance for each attribute for each node in the hierarchy or be able to dynamically calculate relevance when at a particular node in the hierarchy.

Figure 3:
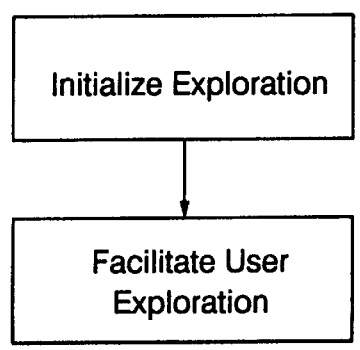
FIG. 3 Overview of Hierarchical Exploration.

The flowchart diagrams starting with FIG. 3 will be used to explain hierarchical exploration. The explanation has been organized into the sections; "Initiating Exploration" an "Facilitating user Exploration", as shown in FIG. 3.

Figure 4:
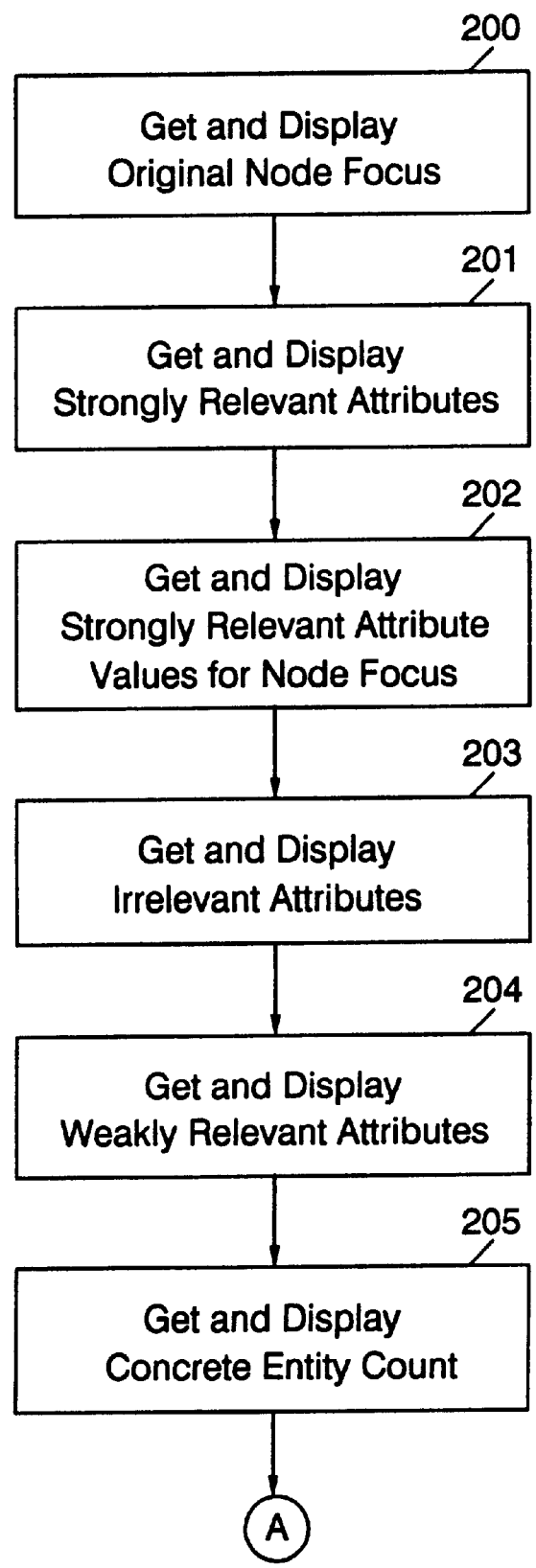
FIG. 4 Representation for Initializing Exploration.

Initializing Exploration; before exploration can begin, the user interface must be initializing. The corresponding functions for initialization are FIG. 4. First, the original node focus obtained and displayed 200. This is the highest level node in a node hierarchy that a user has chosen to act as the starting point for exploration. We then obtain and display the strongly relevant attributes at 201. Strongly relevant attributes are those that are relevant to all the entities of the current node in a hierarchy. Next 202 the strongly relevant attributes values for the node focus are obtained and displayed; these are all the distinct values found for attributes in concrete entities occurring in all hierarchy paths from the node focus. We then obtain and display 203, the irrelevant attributes for the node focus. The weakly relevant attributes for the node focus are obtained and displayed 204. Weakly relevant attributes are attributes relevant to a subset of the entities of the current node in a hierarchy. We then obtain and display the concrete entity count, this is the number of concrete entities occurring in all hierarchy paths from the node of focus 205. It should be noted that with FIG. 4 in place, a user may now interact with the system to perform hierarchical exploration.

Figure 5:
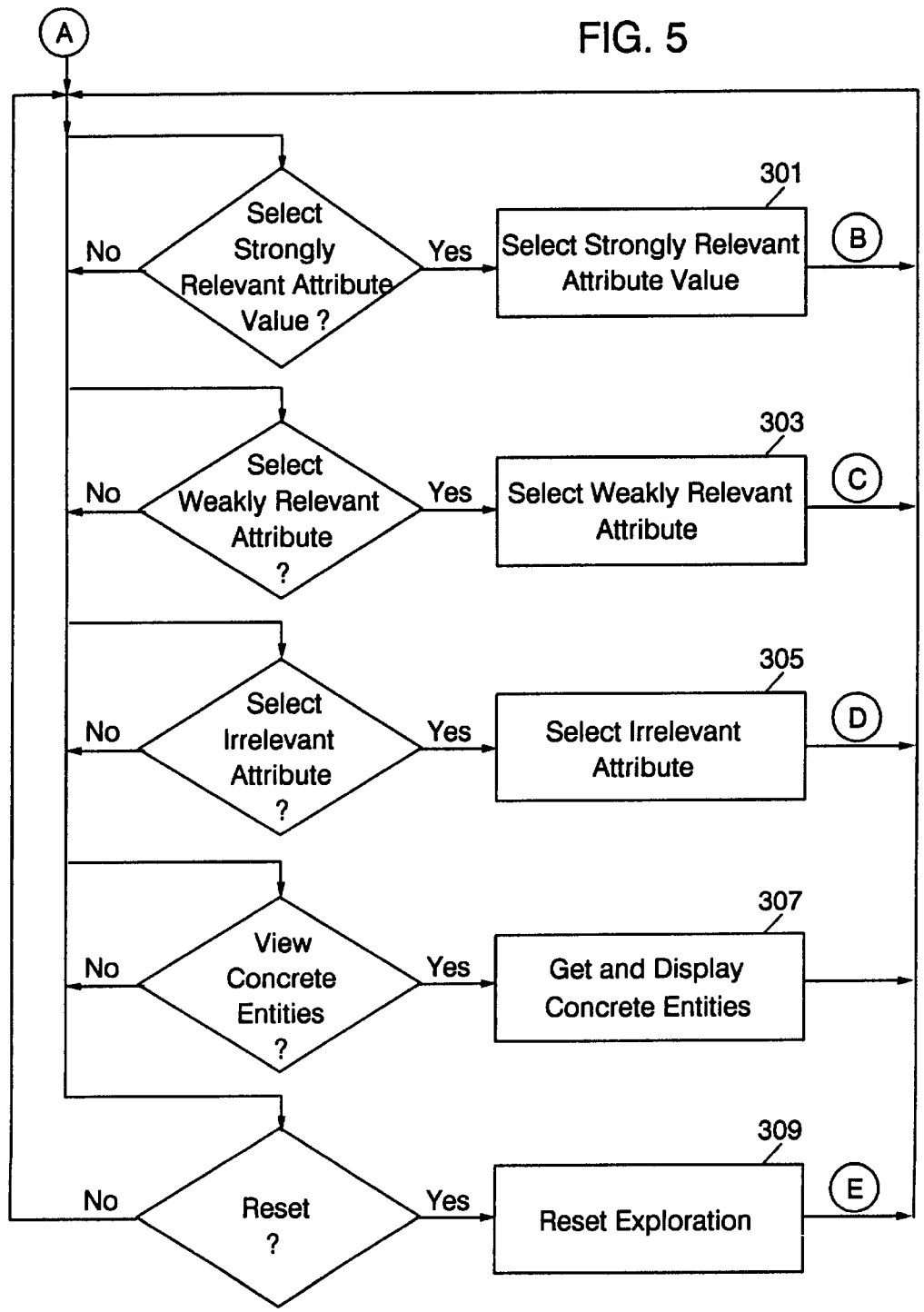
FIG. 5 Demonstrates how User Exploration is Facilitated.

The process if now ready for the user to proceed with the following options for exploring the hierarchy A in FIG. 5. The first option is whether a strongly relevant attribute value is to be selected. If the answer is yes, the strongly relevant attribute is selected, then the process proceeds to B in FIG. 6 where the user selects strongly relevant attribute value 401 then the system builds up constraint list 402, then the system determines the new node focus 403, and the display is refreshed 404. If the answer to 300 in FIG. 5 is no, the next option is whether the user wises to select a weakly relevant attribute 302 FIG. 5. If the answer is yes than the process proceeds to C in FIG. 7, where the user selects weakly relevant attribute at 500. Then the system determines the new node focus 502 and the display is refreshed at 502. If the answer to FIG. 5 at 302 is no, the next option is whether to select an irrelevant attribute in FIG. 5 at 304. If the answer to 304 is yes, then the process moves to D in FIG. 8, at 600 where the user selects irrelevant attribute. This is then followed by the system determining a new node focus 601. The next action 602 is the deletion of irrelevant constraints from the constraint list, followed by refresh the display at 603.

Figure 9:
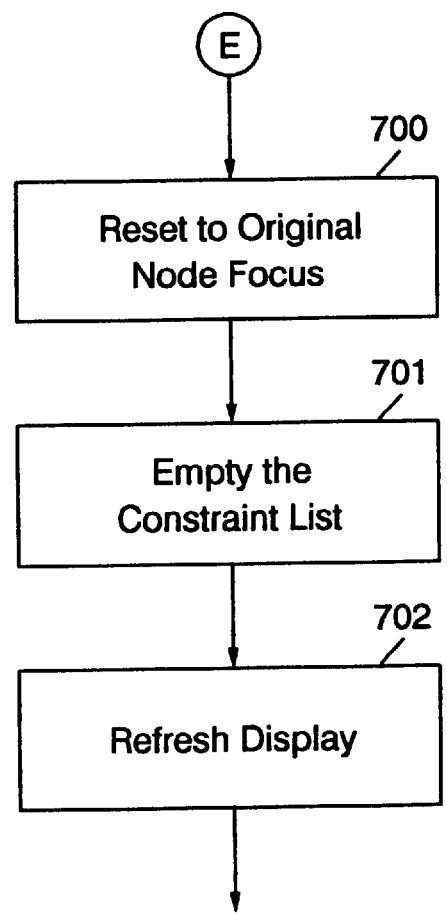
FIG. 9 Shows how to Reset Exploration.

If the answer to the query in FIG. 5 at 304 is no, then the next option is whether to view concrete entities at 306. If the answer is yes, the system displays concrete entities 307. If the answer in FIG. 5 at 306 is no, then the option is available in FIG. 5 at 308 is whether to reset. If the answer is yes then the system, as shown in E. FIG. 9 resets 700 to the original node focus, followed by emptying the constraint list 701 and then refreshing of the display at 702. If the answer to query 308 in FIG. 5 is no, then the system returns to 300 in FIG. 5.

As shown in FIG. 5, the user may proceed with any of the following option for exploring the hierarchy. These options have no inter-dependencies restricting the sequence of their execution. Furthermore, once an option has been chose by a user an executed by the system, a user may proceed exploring with any of the options. However there are cases where it is not possible to chose one of the first three options. For the first option, it is not possible to choose a value for a strongly relevant attribute if only one value exists or remains in the selection list. For a second option, it is not possible to select a weakly relevant attribute if there are no weakly relevant attributes to choose from in the selection list. Similarly, for the third option, it is not possible to select an irrelevant attribute if there are no irrelevant attributes in the selection list.

Figure 6:
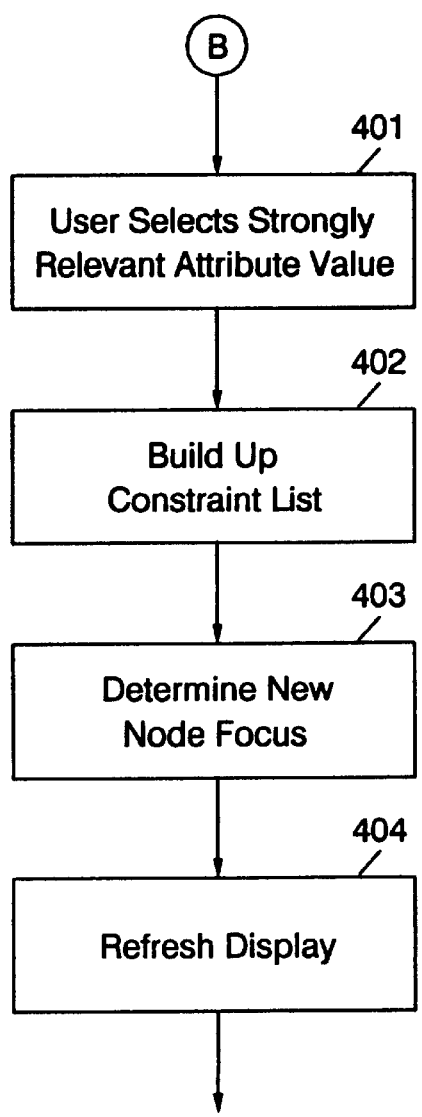
FIG. 6 Demonstrates how Strongly Relevant Attributes are Selected.
Figure 7:
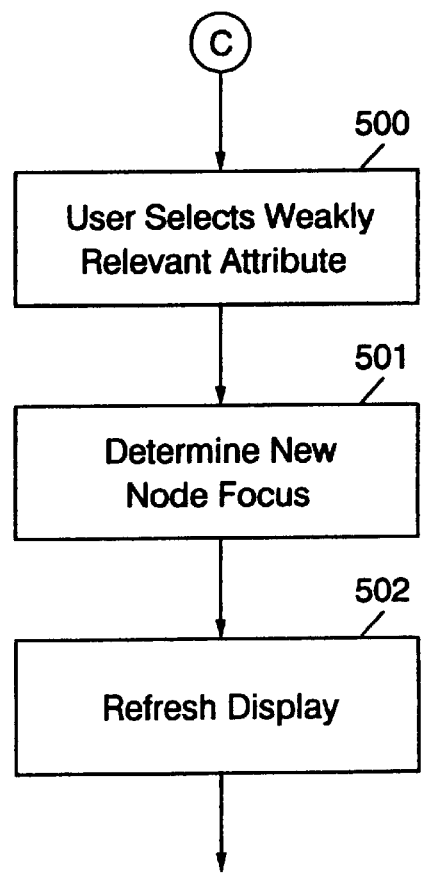
FIG. 7 Demonstrates how Weakly Relevant Attributes are Selected.
Figure 8:
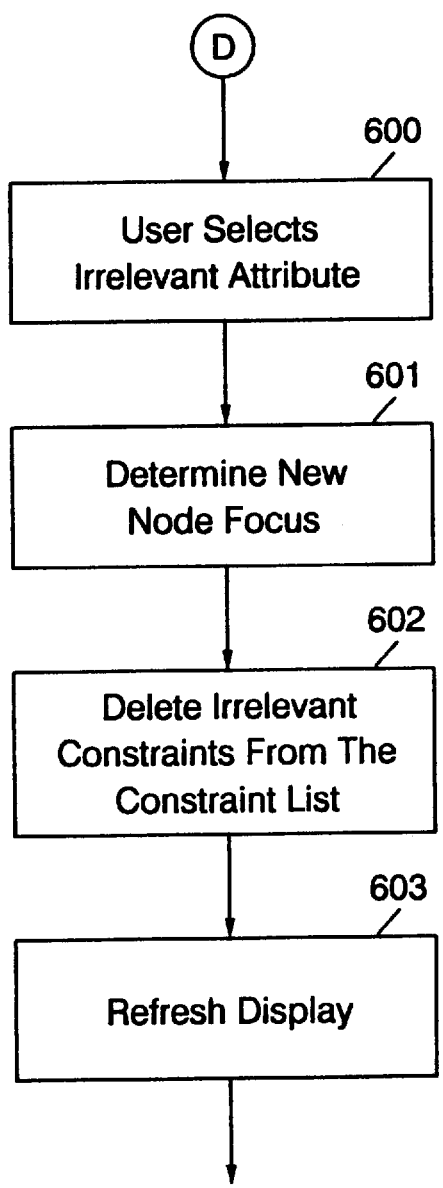
FIG. 8 Demonstrates how Irrelevant Attributes are Selected.
Figure 10:
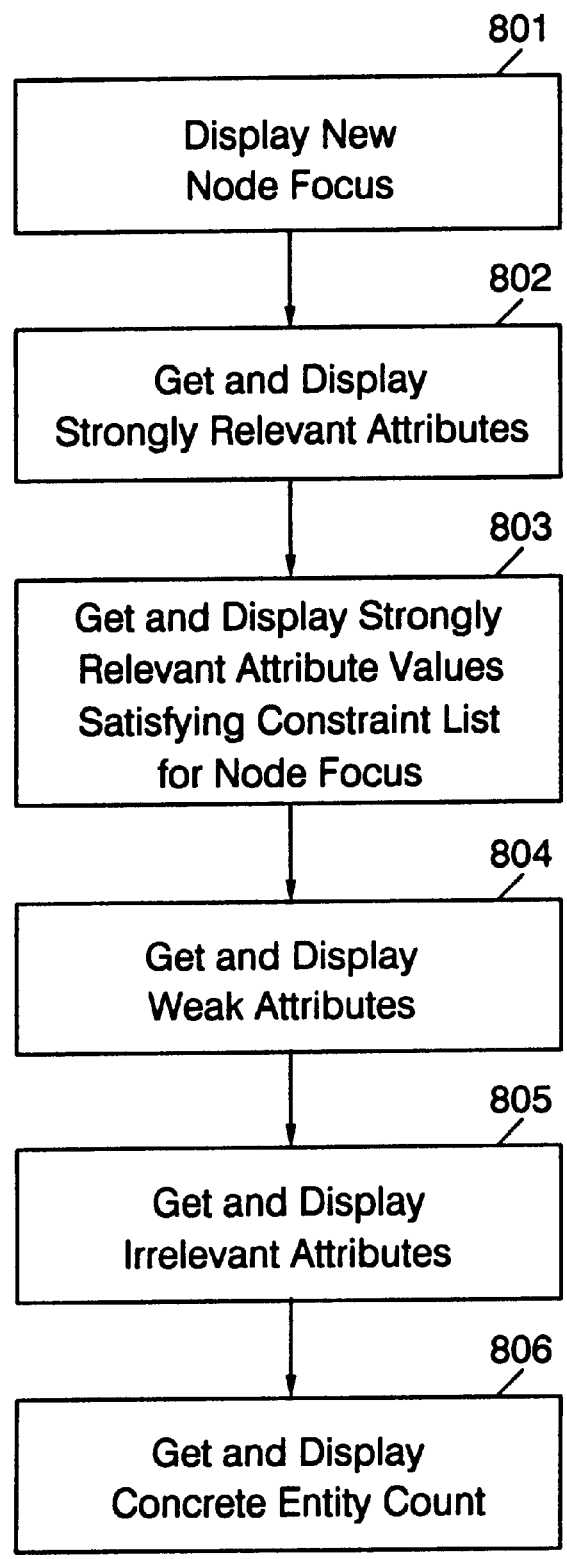
FIG. 10 Demonstrates how the Display is Refreshed.

Select a strongly relevant attribute value FIG. 6
Select a weakly relevant attribute value FIG. 7
Select a irrelevant attribute FIG. 8
View concrete entities FIG. 9
Reset exploration FIG. 10

FIG. 6 is a flowchart diagram of the first option, "Select Strongly Relevant Attribute Value". A user begins by selecting for one of the strongly relevant attributes a distinct value or continuous value (i.e., range of values). This value restriction is recorded as a constraint in the Constraint List. Using the constraints of the Constraint List the system determines the new node focus, this is the highest common node for those concrete entities whose attribute values satisfy the constraints. It should be further noted that the node focus may remain unchanged.

Next the interface is refreshed given the new node focus 801, FIG. 10. Refreshing the interface involves the steps of:

First, obtaining the strongly relevant attributes for the node focus 802.

Second, obtaining and displaying the strongly relevant attribute values for those concrete entities under the node focus that satisfy the constraints 803.

Third, obtaining and displaying the weakly relevant attributes for the node focus 804.

Fourth, obtain and displaying the irrelevant attributes for the node focus 805.

Fifth, obtaining and displaying the count of concrete entities found under all paths from the node focus 806.

It should again be noted that similar to the initialize steps, the refresh steps, reflect those of the implementation and could be performed in any order.

FIG. 7 is a flowchart diagram of the first exploration option, "Select Weakly Relevant Attribute". A user beings by selecting for one of the weakly relevant attributes. The system determines the new node focus; this is the highest common node where the weakly relevant attribute first becomes strongly relevant. Note that no constraints are added to the Constraint List in this option, hence the Constraint list does not change. Next the interface is refreshed given the new node focus (see FIG. 10).

FIG. 8 is a flowchart diagram of the third exploration option, "Select Irrelevant Relevant Attribute". A user begins by selecting one of the irrelevant attributes. The system determines the new node focus; this is the highest common node where the irrelevant attribute first becomes strongly relevant. Note that no constraints are added to the Constraint List in this option, however constraints may be deleted from the Constraint List. The constraints that are deleted are termed Irrelevant Constraints and are those constraints that constrain attributes that have become irrelevant with respect to the new node focus. Finally, the interface is refreshed given the new node focus (see FIG. 10). As part of exploration, a user may at any moment choose to view the relevant concrete entities or reset the exploration system (the fourth and fifth of the exploration options listed above). This is seen in FIG. 5.

By resetting the system a user is allowed to start exploration over from the original starting point in the hierarchy (i.e., the original focus node in the hierarchy). Resetting the system involves the following steps.

First, resetting the focus node to the original node.

Secondly, deleting the existing constraints in the Constraint List.

Third, refreshing the interface (See FIG. 10).

When electing to view the concrete entities, those concrete entities that exist in a path from the node focus as well as satisfy the constraints in the Constraint List are displayed.

Although the decision to view the entities is shown here as a separate function whose execution a user would initiate, this could also be implemented as part of the refresh function where the appropriate concrete entities are constantly displayed and updated in the interface as a result of building constraints and changing node focus.

We claim:

1. An electronic catalog, searching, and navigation system, comprising:

hierarchical navigating means for searching in an electronic catalog said navigating means being characterized by, means for providing attribute relevance for attributes at each node in a hierarchy based on assignment constraints for the nodes which represent concrete entities, and means for combining said attribute relevance of said concrete entities with a forward-checking parametric search.

2. The system as described in claim 1 including a means of implementing said a hierarchical navigation system over a multitude of said hierarchies residing on a base of said concrete entities.

3. A method in an electronic catalog, searching, and navigation system, comprising the steps of:

arranging catalog objects as concrete entities in a node hierarchy, calculating attribute relevance for attributes of the concrete entities at each node in the hierarchy based on assignment constraints made for said concrete entities, and, combining said attribute relevance of the entities with a forward-checking parametric search technique.

4. The method as describe din claim 3 including enabling searching over a multitude of hierarchies residing on a base of said concrete entities.

5. The method as described in claim 3, including using a parametric search technique that facilitates both hierarchical navigation and browsing.

6. A software product on a computer usable medium that is used with a computer for interrogating an electronic catalog where catalog objects are arranged as entities at nodes in a node hierarchy, said product comprising:

a mechanism for providing attribute relevance values for attributes of the entities; and a mechanism for combining the attribute relevance values of the attributes with forward-checking parametric searching.

7. The software product of claim 6, wherein said mechanism for attributing attribute relevance values provides attribute relevance values from the group consisting of strongly relevant, weakly relevant and irrelevant.

8. The software product of claim 6, wherein the mechanism for attributing relevance value provides an attribute of strongly relevant to an attribute relevant to all entities of node in the hierarchy.

9. The software product of claim 6, wherein the mechanism for attributing relevance value provides an attribute relevance value of weakly relevant to an attribute relevant to only a subset of the entities of a node in the hierarchy.

10. The software product of claim 6, wherein the mechanism for attributing relevance provides an attribute relevance value of irrelevant to an attribute which is irrelevant to any entities of a node in a hierarchy.

11. The software product of claim 6, including a mechanism for displaying as a node focus the highest level node in the node hierarchy that a user chooses as start point of for exploration;

a mechanism for displaying to the user the attribute relevance values for the node focus and allowing the user to select at least one of the attributes based on its attribute relevance value; and a mechanism for selecting a new node focus based on the at least one of the attributes selected by the user.

12. The software product of claim 11, wherein said mechanism for attributing attribute relevance values provide attribute relevance values from the group consisting of strong relevant, weakly relevant and irrelevant.

13. The software product of claim 11, wherein the mechanism for attributing relevance values provides an attribute relevance value of strongly relevant to an attribute relevant to all entities of the node focus.

14. The software product of claim 11, wherein the mechanism for attributing relevance values provides an attribute relevance value of weakly relevant to an attribute relevance value of weakly relevant to an attribute relevant to a subset of the entities of the node focus.

15. The software product of claim 11, wherein the mechanism for attributing relevance values provides an attribute of irrelevant to an attribute which is irrelevant to any entities of the node focus.

16. A computer-implemented method for interrogating an electronic catalog where catalog objects are arranged as entities at nodes in a node hierarchy, said method comprising:

providing attribute relevance value for attributes of the entities; and enabling use of said attribute relevance values of the attributes in forward-checking parametric searching.

17. The method of claim 16, wherein said attributing attribute relevance provides attributes from the group consisting of strongly relevant, weakly relevant, and irrelevant.

18. The method of claim 16, including attributing an attribute relevance value of strongly relevant to an attribute relevant to all entities of a node in the hierarchy.

19. The method of claim 16, including attributing an attribute relevance value of weakly relevant to an attribute applicable to only a subset of the entities of a node in the hierarchy.

20. The method of claim 16, including attributing an attribute relevance value of irrelevant to an attribute which is irrelevant to any entities of a node in a hierarchy.

21. The method of claim 16, including displaying as a node focus the highest level node in the node hierarchy that a user chooses as start point for exploration;

displaying to the user the attributes and their relevant attribute values for the node focus and allowing the user to select at least one of the attributes; and selecting a new node focus based on the at least one attribute selected by the user.

22. The method of claim 21, wherein said attributing attribute relevance values provides attribute relevance values from the group consisting of strongly relevant, weakly relevant, and irrelevant.

23. The method of claim 21, including attributing a relevance value of strongly relevant to an attribute relevant to all entities of the node focus.

24. The method of claim 21, including attributing a relevance value of weakly relevant to an attribute applicable to only a subset of the entities of the node focus.

25. The method of claim 21, including attributing a relevance value of irrelevant to an attribute which is irrelevant to any entities of the node focus.

* * * * *